July 7, 1925.                                                    1,544,816
W. L. CUMMINGS
SELF PROPELLED DELIVERY WAGON
Filed Aug. 19, 1922          2 Sheets-Sheet 1
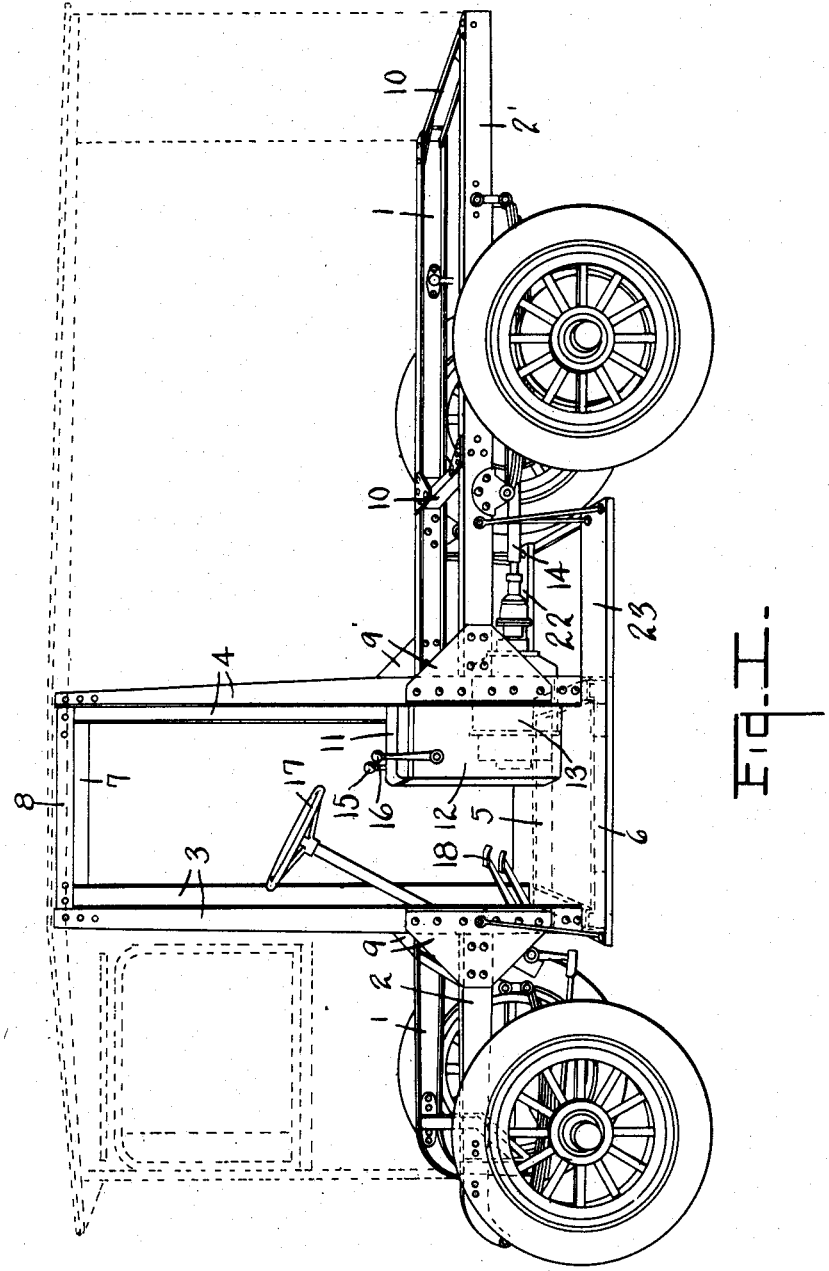
INVENTOR.
William L. Cummings
BY
ATTORNEYS

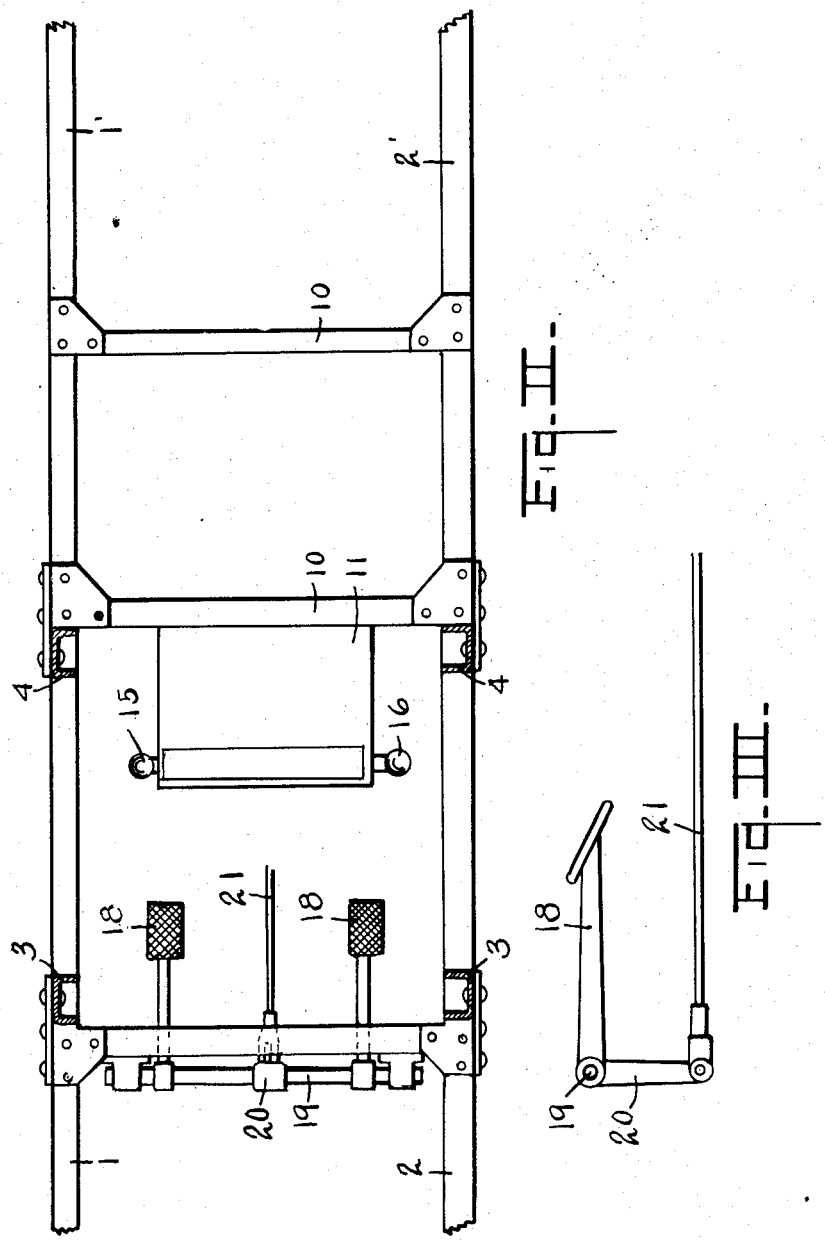

Patented July 7, 1925.

1,544,816

UNITED STATES PATENT OFFICE.

WILLIAM L. CUMMINGS, OF GRAND RAPIDS, MICHIGAN.

SELF-PROPELLED DELIVERY WAGON.

Application filed August 19, 1922. Serial No. 582,954.

*To all whom it may concern:*

Be it known that I, WILLIAM L. CUMMINGS, a citizen of the United States, residing at Grand Rapids, county of Kent, State of Michigan, have invented certain new and useful Improvements in Self-Propelled Delivery Wagons, of which the following is a specification.

This invention relates to improvements in self-propelled delivery wagons. I have shown the same especially adapted to use as a milk wagon.

The object of the invention is to provide an improved construction of frame and running gear whereby the same may be conveniently controlled and steered by an operator from either side without the necessity of ascending into the seat. It is especially adapted to an electrically propelled vehicle, although it can, of course, be applied to an automobile with the usual internal combustion engine by providing an effective gear control.

A further object of the invention is to provide the framework of such a vehicle with its floor dropped low so that the driver can pass through with facility without climbing up.

Further objects, and objects pertaining to details and economies of construction and operation will definitely appear from the detailed description to follow.

I accomplish the objects of my invention by the devices and means described in the following specification. The invention is clearly defined and pointed out in the claims.

A structure which is a preferred embodiment of the invention is clearly illustrated in the accompanying drawing forming a part of this specification, in which:

Fig. I is a side perspective view of a vehicle body embodying the features of my invention, the framework being shown in full lines and the sides of the body in dotted lines for clearness.

Fig. II is a detail plan view of the central part of the framework, showing the disposition of the brake levers and control levers to make them accessible.

Fig. III is a side elevation view of the brake lever, its rock shaft and connection to the brake rods.

In the drawing similar numerals of reference refer to similar parts throughout the several views.

The various parts will be identified by their reference numerals. 1 and 2 are the side rails of the frame, which are divided into two parts, the rear portion being numbered 1' and 2'. Four uprights of channel bar shape 3, 3 and 4, 4 are interposed between the divided parts and are connected together at the bottom by longitudinal bars 5 and 6 at each side, which serve as the floor sills, providing a low cross floor through the car, permitting the driver to pass readily from side to side.

The tops of the uprights are connected together by longitudinal bars 7 and 8. Angular brace plates 9 and 9' connect these uprights to the longitudinal side rails. The side rails are held suitably spaced by cross bars 10, 10, 10, 10.

Within the drop floor is disposed a seat 11, beneath which is a box 12 for containing the electric motor 13 or gear control means in the event an internal combustion engine is used. 14 is the usual propeller shaft extending to drive a rear axle by any suitable means. 15 and 16 are control levers disposed at each end of the seat, where they may be readily grasped by the driver when he steps on the running board from either side. 17 is the centrally disposed steering wheel with its usual connections, which of course can be grasped by the driver from either side, as it is made sufficiently large to be readily reached and affords ready control when grasped with one hand.

The front and rear axles are of usual construction and the details are not shown. Brake pedals 18 are at each side on a transverse rock shaft 19 which is provided with a rock shaft arm 20 which connects to the brake rod 21 which operates brakes for the rear wheels, operating them in the usual way except that there is a brake pedal at each side. Running boards 22 and 23 are on the level with the drop floor of the body which, of course, puts the driver in position to operate the vehicle as soon as he mounts the running board.

From this arrangement it will be seen that the vehicle is completely accessible from both sides and can be driven from either side or from the seat, as desired. The body framework is so supported that very low running boards and floors are secured, thus enhancing the convenience of the vehicle and making it very completely under the control of the delivery man or men, for, with an effective truck or delivery wagon of this kind, it is possible to operate effectively with a man at each side.

Having thus described my invention, what I claim as new and desire to secure by Letters Patent is:

1. In a vehicle construction, the side rails of which are divided, uprights interposed, a suspended floor beneath, and longitudinal connecting bars above, brace pieces connecting the said uprights to the side rails, a seat with box beneath, an electric motor or control gear beneath the said seat with lever control therefor at each end of the seat, a rock shaft for the brake control with pedal at each side, running boards at each side at substantially the level of the floor, all coacting as described for the purpose specified.

2. A frame for a vehicle body with the side rails divided, uprights interposed at the divided ends of each side rail, projecting above and below the side rails, triangular brace plates secured to said uprights and side rails, drop floor beams secured to the lower ends of said uprights, and a roof with longitudinal supports secured to and connecting the upper ends of said uprights, as specified.

3. A vehicle body with central drop floor and running boards at substantially the drop floor level, a driver's seat with driving control levers at each end thereof, and brake pedals at each side connected to actuate the brakes and positioned to be accessible and operated from either the seat or the running board, coacting as specified.

In witness whereof, I have hereunto set my hand and seal.

WILLIAM L. CUMMINGS. [L. S.]